US005984182A

United States Patent [19]
Murrah et al.

[11] Patent Number: 5,984,182
[45] Date of Patent: Nov. 16, 1999

[54] SCAN-AHEAD SYSTEM FOR PROCESSING MERCHANDISE AT A CHECKOUT REGISTER

[75] Inventors: Judith Murrah, St. James; Michael Lanzaro, Lake Grove, both of N.Y.

[73] Assignee: Symbol Technologies, Inc., Holtsville, N.Y.

[21] Appl. No.: 09/149,363

[22] Filed: Sep. 8, 1998

Related U.S. Application Data

[63] Continuation of application No. 08/712,699, Sep. 12, 1996, Pat. No. 5,804,807.

[51] Int. Cl.⁶ .................................................... G06K 15/00
[52] U.S. Cl. ........................................... 235/383; 235/375
[58] Field of Search ...................................... 235/383, 375

[56] References Cited

U.S. PATENT DOCUMENTS

| | | |
|---|---|---|
| 4,373,133 | 2/1983 | Clyne et al. . |
| 5,149,947 | 9/1992 | Collins . |
| 5,186,281 | 2/1993 | Jenkins . |
| 5,208,446 | 5/1993 | Martinez ................................. 235/383 |
| 5,310,997 | 5/1994 | Roach et al. . |
| 5,311,969 | 5/1994 | Dickover et al. . |
| 5,334,821 | 8/1994 | Campo et al. . |
| 5,397,882 | 3/1995 | Van Solt . |
| 5,434,394 | 7/1995 | Roach et al. . |
| 5,468,942 | 11/1995 | Oosterveen et al. . |
| 5,540,301 | 7/1996 | Dumont . |
| 5,557,088 | 9/1996 | Shimizu et al. . |
| 5,646,389 | 7/1997 | Bravman et al. . |

FOREIGN PATENT DOCUMENTS 9002296  5/1992  Netherlands .

OTHER PUBLICATIONS

The Wireless Store, The Strategic Environment for Retailing's Future (Symbol Technologies Brochure) Jan. 1992, p. 15.

Primary Examiner—Harold I. Pitts
Attorney, Agent, or Firm—Mauro Premutico; Gary Serbin

[57] ABSTRACT

The present invention relates to a checkout system providing for the pre-processing of scannable merchandise in a customer's possession. The system employs a portable data scanner which is in communication with a checkout register. The portable data scanner is used to record in a data file an itemized list of articles reflecting merchandise in the customer's possession prior to reaching the checkout register. The customer is provided with a transaction identifier which can be read by the checkout register to retrieve the data file and finish processing of the transaction, thereby increasing the throughput of the checkout register.

10 Claims, 4 Drawing Sheets

SCAN-AHEAD SYSTEM FOR PROCESSING MERCHANDISE AT A CHECKOUT REGISTER

RELATED APPLICATIONS

This application is a continuation of U.S. application Ser. No. 08/712,699, filed Sep. 12, 1996, now U.S. Pat. No. 5,804,807 which is incorporated by reference herein.

FIELD OF USE

This invention relates generally to a system for improving item throughput at a checkout register in a retail facility.

BACKGROUND OF THE INVENTION

Operators of large retail operations such as grocery "supermarkets" must devote significant resources to servicing customers in checkout lanes. In most suburban areas, after a customer has selected items for purchase and placed the merchandise in a cart or other container, the customer is required to (i) remove the merchandise from the shopping container, (ii) place the merchandise on a checkout counter, (iii) wait for the cashier to process each of the selected items for identification and pricing information, and enter the information in the checkout register, (iv) pay the cashier for merchandise, and (v) wait for the merchandise to be bagged and returned into the shopping container. This process is cumbersome, time consuming and generally an annoyance to the customer, especially during times of high traffic periods such as pre-holiday shopping periods. It is vital for retailers to make the checkout process as quick and pleasant as possible for the customer, otherwise a store operator risks losing the customer to a competitor who can provide better service to their customers.

Currently, store operators typically provide their facilities with a number of checkout lanes necessary to service customers during high volume periods such as weekends and pre-holiday shopping periods. This, however, requires that the store operator devote significant resources to equipment and space having little to no utilization during most of the store's operating hours.

Although the introduction of bar codes on products, and bar code equipment at checkout lanes has significantly alleviated some of the above problems within the parameters of the above described checkout systems, it has not completely resolved the problem. These systems have improved the throughput of the checkout registers by making the merchandise identification process must faster and less prone to erroneous data entry. However, the systems have changed little otherwise and many of the same problems still persist.

SUMMARY OF THE INVENTION

It is a general object of the present invention to advance the state of the art of data processing and payment systems in retail facilities.

It is another object of the present invention to provide a checkout system which can be used to increase the throughput at an existing checkout register.

It is a further object of the present invention reduce waiting time for customers waiting to purchase selected items in checkout queues.

It is a further object of the present invention to provide a versatile checkout register with a variable throughput depending on customer needs.

It is a further object of the present invention to provide customers a means for determining amounts due for items selected during a shopping session.

It is a further object of the present invention to provide a pre-processing system which may be modified at the checkout register to include or discard items depending on impulse buying selections by the customer.

It is a further object of the present invention to provide for a checkout system which will reduce the amount of space needed for checkout registers and associated equipment in a retail facility.

In keeping with these objectives, and others which will become apparent hereinafter to those skilled in the art, a system is provided for pre-processing items selected for purchase by a customer waiting in a checkout queue and providing the customer with a transaction summary carrier to be presented at the checkout register. The customer presents the transaction summary carrier to the checkout register attendant which completes the transaction and accepts payment from the customer.

In a preferred embodiment of the present invention, the merchandise selected by the customer is pre-processed prior to the customer reaching the checkout register with a radio frequency terminal having an integrated bar code scanner. A customer record of customer selected items is established with the portable scanning terminal and communicated to the checkout through the RF communication means. Alternatively, the scanner commences a transaction record of the items selected by the customer. The transaction record is stored by the portable terminal on retrievable media, such as a memory device or a high density bar code, and a transaction summary carrier including means for regenerating the transaction record is provided to the customer. The customer presents the transaction carrier to the cashier at the checkout register who processes the transaction through a normal payment/debit transaction. At such time the customer may also have additional items scanned or otherwise removed from the transaction summary.

The number of customers which may be served with a system of the present invention may be varied according to the number of portable scanners used to pre-process customers waiting in a queue. Thus, during a busy holiday season, multiple pre-processing attendants with portable scanners can be used to pre-process individuals in a long checkout queue. During slow periods no pre-processing is used. The number of checkout registers is minimized while maintaining variable throughput capability in the system.

BRIEF DESCRIPTION OF THE DRAWINGS

The present invention will be understood and appreciated more fully from the following detailed description, taken in conjunction with the drawings, in which.

DETAILED DESCRIPTION OF THE PREFERRED EMBODIMENTS

By way of an example, the present invention is illustrated in terms of a preferred method and apparatus used in a checkout system in a retail environment. The example application described herein is only one example application of the present invention and is provided for the purpose of better explaining the present invention. The present invention may be applied to any number of other data collection systems having a plurality of potential users collecting pre-coded items which need to be processed prior to exiting the facility. Thus, the present invention should not be limited to the specific example described herein.

I. The Pre-Processing System

Figure 4:
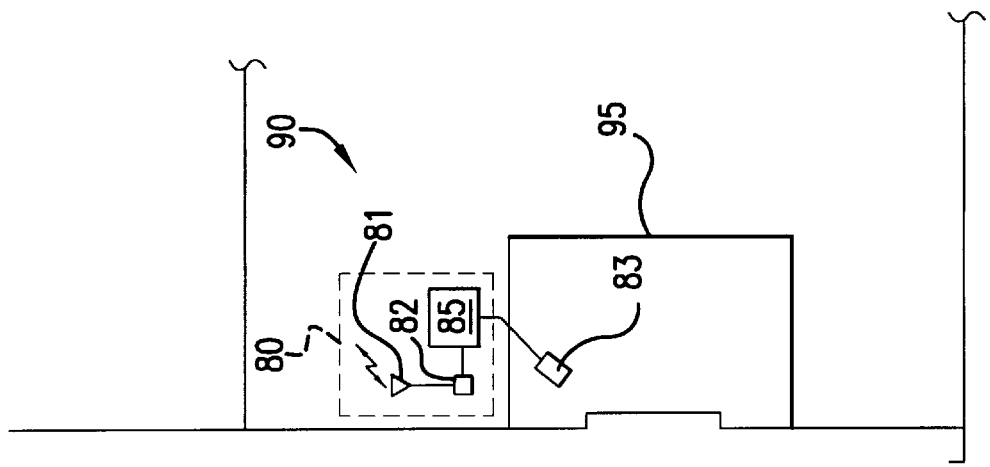
FIG. 4 schematically shows an example of a store arrangement suitable for use in a preferred embodiment of the present invention.
Figure 4:
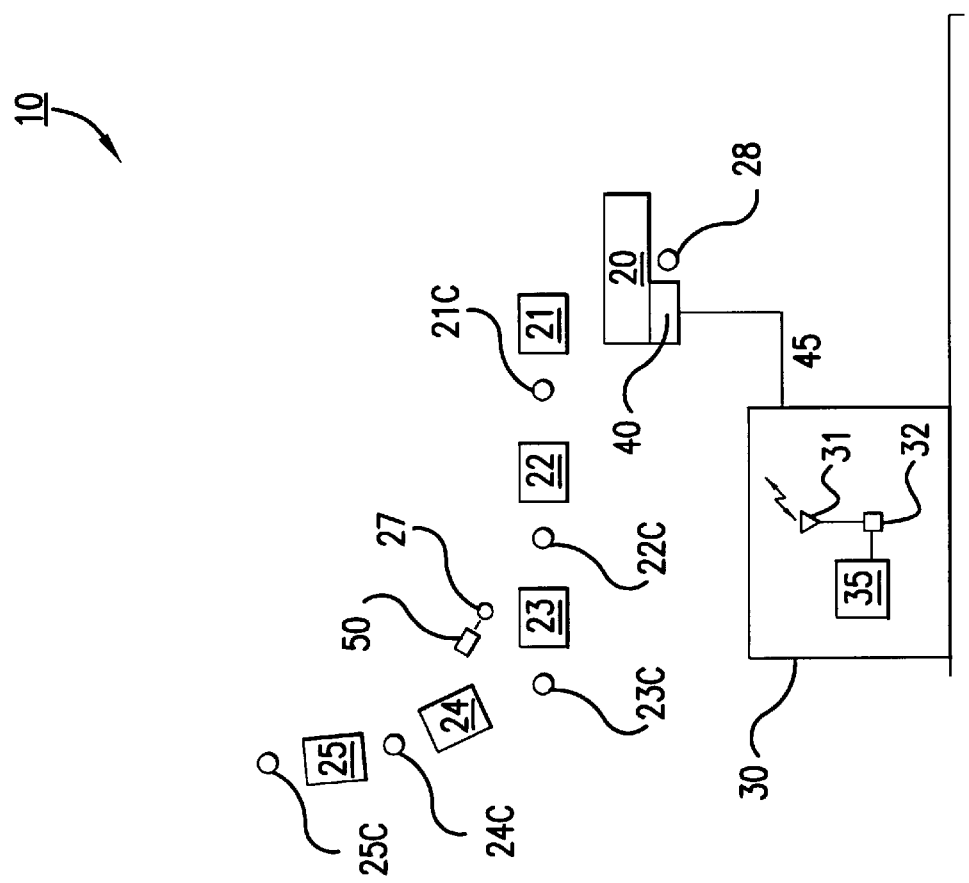

A preferred embodiment of the system of the present invention is illustrated in FIG. 4. A retail establishment, such as a grocery supermarket, is provided with at least one checkout register 40 for itemizing customer purchases and receiving payment. The checkout register contains a bar code reader for reading bar code indicia on merchandise sold at the store. The checkout register is attended by at least one register attendant 28. The register 40 is usually provided with a counter for processing merchandise stored in a customer shopping container 21. Normally, the register attendant requires that the customer unload the merchandise from the shopping container such as a cart 21 onto the counter 20. The items are then scanned into the checkout register which maintains a record of the transaction. Some items may require manual entry at the checkout register 40 via a register keyboard of their corresponding bar coded indicia or weighing of bulk items such as fruits and vegetables.

In a preferred embodiment of the present invention, the checkout register 40 is connected to a central processing unit 30 via a communication link 45. The central processing unit 30 contains up-to-date product information for every store item offered for sale. Item price is a part of that product information.

In the preferred embodiment, every time an item is processed by scanning or by manually entering its bar coded indicia into the checkout register, an item information request is sent to the central processing unit. The central processing unit accepts the request and transmits the product information, including the item price, back to the checkout register. The customer record inside the register gets supplemented with the product purchase price. After all the items have been processed, the preliminary total price is calculated. The final price is obtained by adjusting the preliminary total price based upon any discount coupons and credits presented by the customer. After the checkout register transaction is completed, the customer tenders payment and the merchandise is bagged for the customer. In the event the merchandise is sufficiently voluminous, the bags are replaced into the container which may be taken by the customer out of the store.

In the event customer traffic results in a backup of the checkout register queue, an additional roving attendant 27 is used to pre-processes each of the customer's merchandise with a portable scanning terminal 50 having an integrated bar code scanner. Portable scanning terminals are well known in the art of bar code scanning and are available from companies such as Symbol Technologies, Inc. of Holtsville, N.Y. The portable scanning terminal used in a preferred embodiment of the present invention contains a radio transceiver for communication with the central processing unit 35. Depending on the available bandwidth of the radio communication link on the local area network, price information for all the items offered for sale by the store could be stored either on memory in the portable terminal 50 or it could be looked up by requesting the information from the central processing unit. In the event the information is stored on the portable terminal 50, the information could be downloaded into the portable scanning terminal's memory during the store's off hours or low activity hours. As explained below, the system could also be implemented without a portable terminal having a radio transceiver.

If a customer has a store loyalty card, the card number may be used as the customer's purchase record identifier. The card number may be bar coded, magnetically coded, or printed onto the card in human readable characters. If the customer does not have a loyalty card, a temporary identification number may be assigned to the customer by the roving attendant in the form of a printed receipt or a pre-printed card in the roving attendant's possession. Alternatively, the customer could provide a unique identification code such as a phone number or social security number which could be associated with the customer's purchase record. In any case, the customer's identification number becomes the customer's purchase record identifier.

The roving attendant 27 uses the portable scanning terminal to create an itemized list of all items in the customers shopping cart 23. The roving attendant 27 initiates a pre-register transaction by scanning or manually entering the customer's purchase record identifier into the terminal. In a preferred embodiment, this initialization creates a customer purchase record inside the portable terminal's memory. Afterwards, each item in the customer's shopping container 23 is added to the customer's purchase record by the attendant scanning the individual item's bar code or, if necessary, manually keying in the bar code's human readable alpha-numeric sequence. Although not necessary, in a preferred embodiment of the present invention, an item's price is retrieved form the terminal's memory after each entry and shown on the terminal display. Alternatively, a list may be generated without price retrieval. The price would be calculated at the cashier's register 40.

If the customer decides against purchasing an item which has already been added to his purchase record, the roving attendant can delete the item from the customer's purchase record. After an item has been added to the customer's purchase record, the roving attendant places the item into a purchase bag, provided to the customer by the roving attendant. After the roving attendant 27 completes scanning all of the customer's merchandise, in the preferred embodiment of the present invention, the attendant tallies the total on the portable data collecting terminal 50, and submits the contents of customer's record and its identifier to the central processor 30 over a wireless communication network. The central processor 30 receives the data over an antenna 31. The signal is then decoded by a central data processor 32 and stored into a newly created customer data file in memory 35.

After storing the customer's data file, the central processor 30 transmits an acknowledgment signal to the portable scanning terminal 50. If the portable terminal is provided with a printer, the attendant 27 is then prompted to provide the customer with a printed pre-register transaction ticket. The use of a transaction ticket is preferred in systems employing non-radio frequency communication networks. These systems preferably employ high density bar code technology such as AIM standard PDF 417 to generate a record of the purchased items which can be machine read by the checkout register 40. If the ticket is used in an RF networked system, the ticket may contain an address of the location inside the central processor where the customer's data file is stored, or it could contain the customer's record identification number which acts as a pointer to a location of the customer's data file inside the central processor's memory.

In addition to providing the customer with the printed ticket, the roving attendant seals the purchase bag which contains the purchased items. The printed ticket is then presented by the customer to the checkout register attendant 28. The printed ticket is entered into the register which uses the data to look up the customer data file on the central processing system 30. The register 40 communicates with the central processing system 30 through a communication network connection 45. The communication network may be a hardwired or an RF communication network. After retrieving the customer data file, the register attendant 28 enters any additional items which may have been selected by the customer during the wait, but after the pre-register transaction was completed. Similarly, the register attendant 28 may also delete items from the customer's data file which the customer may wish to return. The register attendant also accepts any coupons the customer may present to the register attendant. Afterwards, the attendant obtains the total purchase price and accepts the customer's payment via any standard payment method.

It is preferred that the roving attendant 27 be provided with a plurality of bags to bag the merchandise at the time the items are scanned. Each bag may be uniquely identified with pre-marked codings or adhesive stickers so as to add an additional level of security. The identification of the bags for the specific customer may also be recorded in the customer data file. This would provide secure transportation of selected items and also avoid the need to rehandle the items.

II. The System Architecture

A. Portable Data Collecting Terminal

Figure 1:
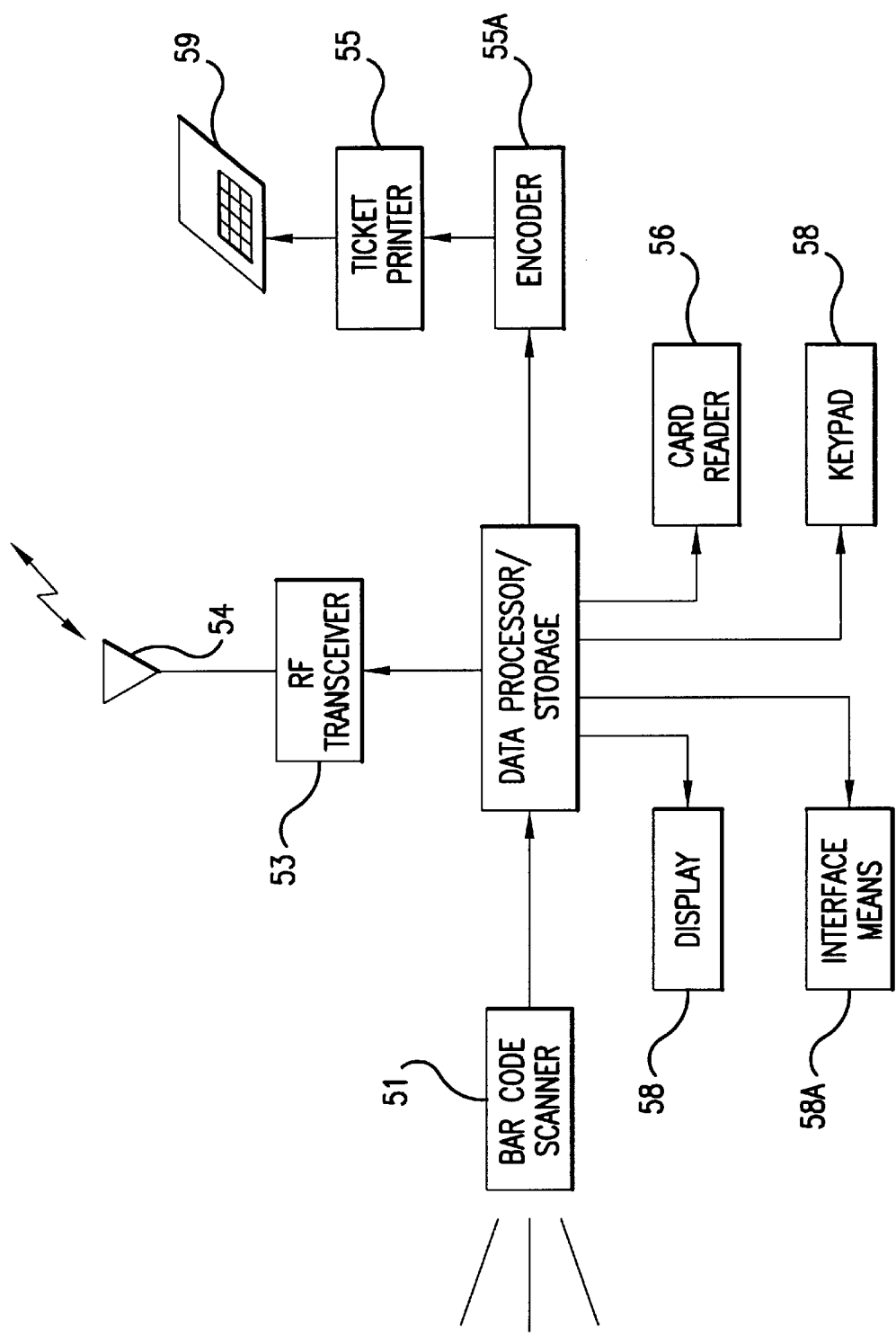
FIG. 1 is a functional block diagram of a portable scanning terminal which may be used in a preferred embodiment of the present invention.
Figure 3:
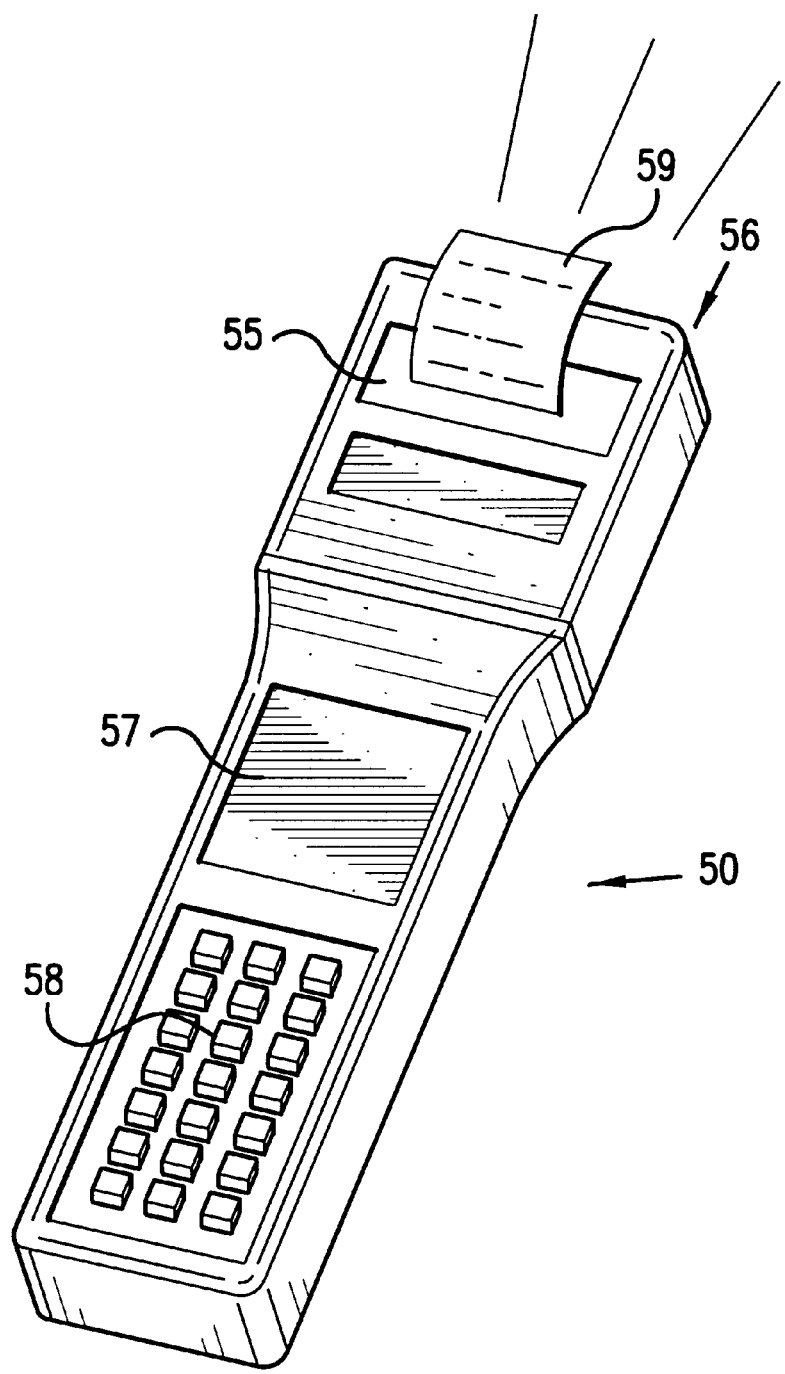
FIG. 3 is a top perspective view of a portable scanning terminal in a preferred embodiment of the present invention.

As illustrated in FIGS. 1 and 3, in a preferred embodiment of the present invention, a portable data collecting terminal 50 (the "terminal") includes a bar code scanner 51, a printer 55, a magnetic card reader 56, a display 57, a keypad 58 and a communication interface port 58A. The scanner 51 is coupled to a data processor and storage device 52 which is connected to an RF transmitter 53, which is further coupled to an RF antenna 54. Bar code scanners are known in the art and are available from companies such as Symbol Technologies, Inc. A bar code decoder may be integrated into the scanner or may be a part of the data processor and storage device. Keypad 58 is used to manually enter alpha-numeric content of the bar codes into the scanning terminal and to provide system commands to the portable scanning terminal.

In one embodiment of the present invention, the data processor and storage device 52 includes memory having a data base of bar code values and corresponding product information stored therein. The decoded bar code value is used to look up product information including a corresponding price value. The data base is updated by the central processing system 30 via the communication interface port 58A. The updates are performed during the store's low volume hours or during off hours. During a pre-register transaction, when every purchased item is being scanned by the roving attendant, a customer purchase record is generated using the downloaded product information data base. The card reader 56 is used to read customer identifier information such as credit card data from the customer's loyalty card. The display is used for presenting various information to the roving attendant and the customer during a pre-register transaction. When the pre-register transaction is complete, the customer purchased product record is transmitted over the RF communications network via the RF transmitter 53 and antenna 54 to the central processing system. The central processor responds with an address of the newly created file.

After an acknowledgment signal is received by the terminal from the central processing system, the portable scanning terminal 50 generates a bar coded ticket receipt 59 for the customer. The portable scanning terminal's data processor communicates the receipt information to an encoder 55A which translates the information to the printer 55 for printing of the receipt 59.

B. The Central Processing System

Data communicated over the communication network is processed by a central processing system 30. As described above, the central processing system is provided with an antenna 31, a central data processor 32 and a memory 35.

The scanning terminal 50 may also be connected to the register 40 over a communication network. The communication link could be hard wired, wireless or any combination thereof.

C. The Checkout Register

Figure 2:
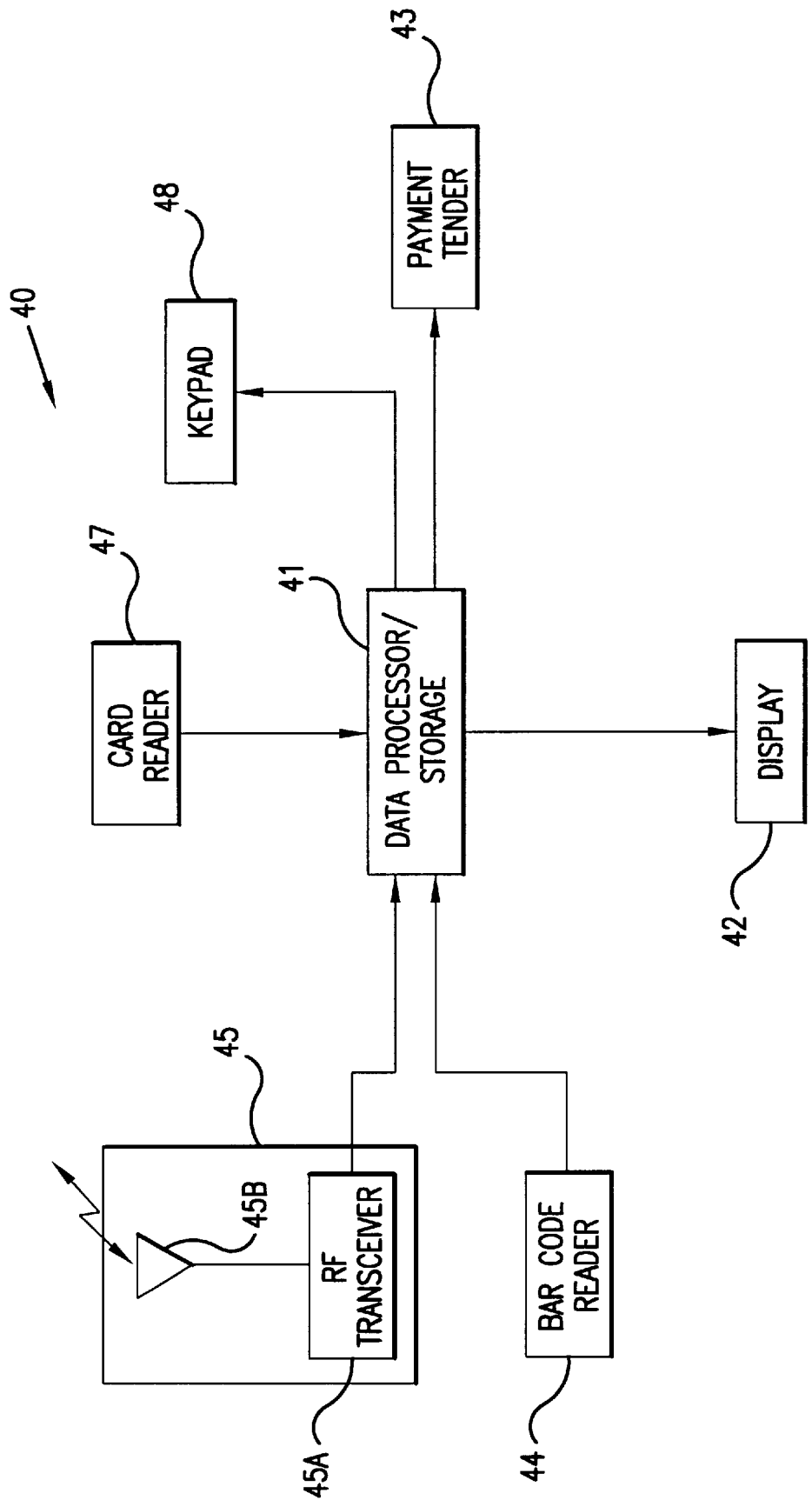
FIG. 2 is a functional block diagram of a checkout register which may be used in a preferred embodiment of the present invention.

As shown in FIG. 2, the checkout register is provided with a register data processor and memory means 41. The register data processor and memory means 41 is coupled to a bar code scanner 44. The scanner 44 may be used to either read a printed transaction identifier previously provided to the customer by the roving attendant or to scan additional products selected by the customer for purchase after the original items were scanned into the system.

The checkout register is also provided with a communication link 45. As shown, the communication link 45 is an RF communication link having an RF antenna 45B and an RF signal processor 45A. The communication link 45 connects the checkout register 40 to the central processing system 30. In an alternate embodiment the link could be a hardwired communication channel.

The checkout register 40 is further provided with a card reader 47, a register keypad 48 and a display 42. The card reader 47 is used to access information stored on any of the customer's magnetic stripe cards. The register keypad 48 is used to manually enter various transaction information, including the data encoded on the item bar code which can not be read by the bar code scanner. The display 42 is used to visually represent transaction information for the register attendant and the customer. A payment tender system may also be connected to the checkout register 40 for receiving various forms of EFT transfers for payment by the customer. The checkout register may also be provided with means for deactivating EAS tags. All of the functional blocks described above interconnect with the register data processor and memory means 41.

D. Warehousing Facility

In an alternative embodiment of the present invention, a warehouse or customer service center is provided for large article pick-up. Thus, in facilities selling large items such as appliances or motorized equipment, a customer would simply pick up a ticket for the item. At the checkout register 40, the attendant would scan the ticket which is coded to indicate that the item is a warehoused item. Upon entry of the item into the customer's data file, the checkout register (or central computer) generates a ticket at the customer service desk instructing the attendants to get the item and wait for the identified customer to pick up the purchased item. Alternatively, if the roving attendant is being utilized with an RF equipped portable scanning terminal, the ticket is produced at the warehousing facility upon the scanning of the item by the roving attendant. A second clearance ticket to be generated at the warehousing facility could also be generated after the items are paid for. This would inform the customer service attendants that the retrieved item has been paid for and can be distributed to the customer upon the presentation of a receipt or other form of identification, i.e., a customer loyalty card corresponding to the ticket generated at the customer service area. Although discussed in the context of printed tickets, it would also be possible to implement this warehouse system using video tickets and smart card receipts.

As shown in FIG. 4, a warehousing facility 90 is provided for storing large bulky items displayed in the showroom. The warehouse facility is provided with a customer service desk 95 and a communication system 80. The communication system is illustrated as an RF system, but may be hardwired to the control computer 30. The communication system 80 includes an RF antenna 81, a transceiver 82 and a data processor 85. In addition, the system is provided with a terminal 83. The item selected for customer purchase is communicated through the RF network through antennas 31 and 81. The item or items selected are then displayed on the terminal 83 and a ticket may be printed on a printer (not shown). The customer service attendant then proceeds to either collect the requested items at the customer service desk 95. In the event the warehousing facility is provided with an automated delivery system (not shown), the communication system 80 could automatically communicate instructions to the system.

Based on the above disclosure, it would be obvious to those skilled in the art that many modifications could be made to the above system without departing from the spirit of the invention. For instance, rather than generating a customer data file in a centralized memory which may be retrieved by the checkout register, the portable scanner could print out a receipt using high density encoding techniques such as PDF 417 which are known in the art. Such a receipt could provide all the information which would otherwise be included in the customer data file. The checkout register would then be provided with an appropriate bar code decoder which would translate the specific symbology used into machine readable code to generate a customer data file locally. This customer data file could then be communicated to a centralized memory for subsequent use by the register attendant.

Alternatively, the terminal 50 could function simply as a dumb terminal and all data is stored and processed at the central processing system 30. The portable scanning terminal would transmit customer item selection after every customer purchase record entry, rather than waiting until all the purchased items have been entered into the portable scanning terminal's memory. The central processing system 30 would respond to the terminal's transmission with the corresponding item information. This would ensure that up to date price information is delivered to the customer at the time the merchandise is scanned and reduces the resources necessary to implement the function of the terminal. Such an embodiment could be especially useful in a system employing a large number of the terminals 50 which would otherwise need to be updated periodically.

In addition, the centralized processing system could be integrated into one of the checkout registers. Moreover, although the preferred embodiments of the present invention have been discussed with reference to RF communication links, it would also be possible to use other forms of wireless communication links to form either a local or wide area network to communicate data between the different components in the system.

Although the system has been described in the context of bar coded indicia on articles, the present invention could also be implemented on systems employing other coding schemes. An example of such an alternative scheme is radio frequency identification tags.

We claim:

1. A system for fulfilling an order at an order fulfillment station with items stored in a remote location from a location of order entry, said system comprising:
   (a) a wireless network for the bidirectional communication of data;
   (b) a terminal having
      (i) a data entry mechanism for entering data including an order entry command indicative of an item located at the remote location; and
      (ii) a radio for communicating a set of data over said wireless network, said set of data indicative of the item located at the remote location and an identifier verifying the order and its destination;
   (c) a verification receipt indicative of said identifier; and
   (d) an order fulfillment station including
      (i) a communication link for receiving at least some selected portion of said set of data including said identifier to be present on the verification receipt,
      (ii) a display for displaying said selected data, and
      (iii) an acknowledgement entry for acknowledging fulfillment of said order.

2. A system according to claim 1, wherein said terminal further comprises a printer.

3. A system according to claim 1, wherein said terminal further comprises a bar code scanner.

4. A system according to claim 3, wherein said bar code scanner is a laser scanner.

5. A system according to claim 1 further comprising a central host terminal for controlling a flow information within said system.

6. A system for fulfilling an orders with an item stored in a remote location, said system comprising:
   (a) a central host;
   (b) a wireless network for the bidirectional communication of data;
   (c) a terminal having
      (i) a data entry mechanism for entering an order entry command indicative of an item located at the remote location; and
      (ii) a radio for communicating a set of data to said central host over said wireless network, said set of data corresponding to the order entry command, said set of data indicative of the item stored at the remote location and an order identifier; and
   (d) a point of sale register in communication with said central host over said wireless network for issuing a verification receipt corresponding to said order identifier upon payment for the order; and
   (e) an order fulfillment station for fulfilling the order upon receiving said verification receipt, said order fulfillment station including
      (i) a display for displaying data, and
      (ii) a printer for printing said data.

7. A system according to claim 6, wherein said terminal further comprises a printer.

8. A system according to claim 6, wherein said terminal further comprises a bar code scanner.

9. A system according to claim 8, wherein said bar code scanner is a laser scanner.

10. A system according to claim 6, wherein said order fulfillment station further comprises a printer.

* * * * *